US010501040B2

United States Patent
Kondo et al.

(10) Patent No.: US 10,501,040 B2
(45) Date of Patent: Dec. 10, 2019

(54) OCCUPANT PROTECTION APPARATUS FOR VEHICLE

(71) Applicant: SUBARU CORPORATION, Tokyo (JP)

(72) Inventors: Takao Kondo, Tokyo (JP); Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/241,827

(22) Filed: Jan. 7, 2019

(65) Prior Publication Data

US 2019/0135217 A1 May 9, 2019

Related U.S. Application Data

(62) Division of application No. 15/419,818, filed on Jan. 30, 2017.

(30) Foreign Application Priority Data

Mar. 31, 2016 (JP) .................. 2016-070781

(51) Int. Cl.
*B60R 21/18* (2006.01)
*B60R 1/00* (2006.01)
(Continued)

(52) U.S. Cl.
CPC ............... *B60R 21/18* (2013.01); *B60R 1/00* (2013.01); *B60R 21/013* (2013.01);
(Continued)

(58) Field of Classification Search
CPC ..................................................... B60R 21/18
(Continued)

(56) References Cited

U.S. PATENT DOCUMENTS 5,947,513 A * 9/1999 Lehto .................. B60R 21/18
280/730.1
6,382,666 B1 5/2002 Devonport
(Continued)

FOREIGN PATENT DOCUMENTS

CN 105196898 A 12/2015
DE 102012014600 A1 * 1/2014 ............. B60R 21/18
(Continued)

OTHER PUBLICATIONS

Office Action and Election of Species Requirement in U.S. Appl. No. 15/419,818 dated Oct. 9, 2018.
(Continued)

*Primary Examiner* — Keith J Frisby
(74) *Attorney, Agent, or Firm* — McGinn I.P. Law Group, PLLC.

(57) ABSTRACT

An occupant protection device for a vehicle includes: a three-point seatbelt device having a seatbelt extendable across a front of an upper body of an occupant sitting on a seat; and a belt airbag device including a belt airbag that is provided at a shoulder belt section, which is extendable from a shoulder to a waist of the occupant, of the seatbelt the belt airbag being configured to be deployed when a collision occurs. The belt airbag includes a belt-direction deployment section extendable and deployable along the shoulder belt section, and an intersecting-direction deployment section extendable and deployable in a direction intersecting the shoulder belt section. The belt-direction deployment section and the intersecting-direction deployment section are configured to form a single bag by being coupled to each other below a head of the occupant sitting on the seat.

4 Claims, 6 Drawing Sheets

(51) Int. Cl.
  *B60R 21/013*    (2006.01)
  *B60R 21/0132*   (2006.01)
  *B60R 21/0134*   (2006.01)
  *B60R 21/262*    (2011.01)
  *B60R 21/015*    (2006.01)
  *B60R 22/14*     (2006.01)
  *B60R 21/01*     (2006.01)

(52) U.S. Cl.
  CPC ...... *B60R 21/0132* (2013.01); *B60R 21/0134* (2013.01); *B60R 21/0155* (2014.10); *B60R 21/01548* (2014.10); *B60R 21/01554* (2014.10); *B60R 21/262* (2013.01); *B60R 22/14* (2013.01); *B60R 2021/01013* (2013.01); *B60R 2021/01311* (2013.01); *B60R 2021/01317* (2013.01); *B60R 2021/01327* (2013.01); *B60R 2300/105* (2013.01); *B60R 2300/301* (2013.01)

(58) Field of Classification Search
  USPC .......................................................... 280/733
  See application file for complete search history.

(56) References Cited

U.S. PATENT DOCUMENTS

2003/0034640 A1* 2/2003 Sollars, Jr. .............. B60R 21/18
                                                    280/733
2005/0230945 A1   10/2005 Watanabe
2009/0236834 A1   9/2009  Turner et al.
2011/0148081 A1   6/2011  Smith
2017/0050601 A1*  2/2017  Kobata ................... B60R 21/18

FOREIGN PATENT DOCUMENTS

| GB | 2405840 A    | * | 3/2005  | ............. B60R 21/18 |
| JP | 63258239 A   | * | 10/1988 | |
| JP | 2005-297917 A |  | 10/2005 | |
| JP | 2015-193316 A |  | 11/2015 | |

OTHER PUBLICATIONS

Japanese Office Action dated Aug. 8, 2017 in Japanese Application No. 2016-07081 with English translation thereof.
Chinese Office Action, dated Aug. 24, 2018, in Chinese Application No. 201710056006.4 and English Translation thereof.
United States Office Action dated Jan. 15, 2019 in U.S. Appl. No. 15/419,818.
United States Office Action dated Mar. 29, 2019 in U.S. Appl. No. 15/419,818.
United States Office Action dated Jun. 13, 2009 in U.S. Appl. No. 15/419,818.
United States Office Action dated Aug. 14, 2019 in U.S. Appl. No. 15/419,818.

* cited by examiner

OCCUPANT PROTECTION APPARATUS FOR VEHICLE

CROSS-REFERENCE TO RELATED APPLICATIONS

The present application is a Divisional Application of U.S. patent application Ser. No. 15/419,818, filed on Jan. 30, 2017, which is based on Japanese Patent Application No. 2016-070781 filed on Mar. 31, 2016, the contents of which is incorporated herein by reference in its entirety.

BACKGROUND

1. Technical Field

The present invention relates to occupant protection devices for a vehicle.

2. Related Art

In vehicles, such as automobiles, three-point seatbelt devices and airbag devices are used for protecting occupants in the event of collisions, as described in Japanese Unexamined Patent Application Publication No. 2015-193316.

In a three-point seatbelt device, a seatbelt extends from the outer shoulder toward the inner waist, in the vehicle width direction, of an occupant sitting on a seat, and further extends toward the outer waist.

However, since the three-point seatbelt device only restrains the upper body of the occupant, it is not possible to suppress contact of the occupant's head and neck with the upper body when a collision occurs.

SUMMARY OF THE INVENTION

Accordingly, in a vehicle, it is desirable to readily suppress contact of the occupant's head and neck with the upper body when a collision occurs.

An aspect of the present invention provides an occupant protection device for a vehicle including a seat on which an occupant to board the vehicle is to sit; a three-point seatbelt device having a seatbelt extendable across a front of an upper body of the occupant sitting on the seat; and a belt airbag device including a belt airbag that is provided at a shoulder belt section, which is extendable from a shoulder to a waist of the occupant, of the seatbelt. The belt airbag is configured to be deployed when a collision occurs. The belt airbag includes a belt-direction deployment section that is extendable and deployable along the shoulder belt section, and an intersecting-direction deployment section extendable and deployable in a direction intersecting the shoulder belt section. The belt-direction deployment section and the intersecting-direction deployment section are configured to form a single bag by being coupled to each other in an upwardly protruding state below a head of the occupant sitting on the seat.

The belt-direction deployment section may have a length identical to a length of the intersecting-direction deployment section, and the intersecting-direction deployment section when the belt-direction deployment section extends along the shoulder belt section. The belt-direction deployment section may form a substantially V-shape by being coupled to each other at lower ends thereof.

The belt-direction deployment section may be longer than the intersecting-direction deployment section when the belt-direction deployment section extends along the shoulder belt section. A lower end of the intersecting-direction deployment section may be coupled to a center of the longer belt-direction deployment section, so that a substantially y-shape is formed.

The belt-direction deployment section and the intersecting-direction deployment section may form a substantially X-shape by being coupled to each other at centers thereof.

A filler that fills a space between the belt-direction deployment section and the intersecting-direction deployment section may be formed above an area where the belt-direction deployment section and the intersecting-direction deployment section are coupled to each other.

DETAILED DESCRIPTION

An implementation of the present invention will be described below with reference to the appended drawings.

Figure 1:
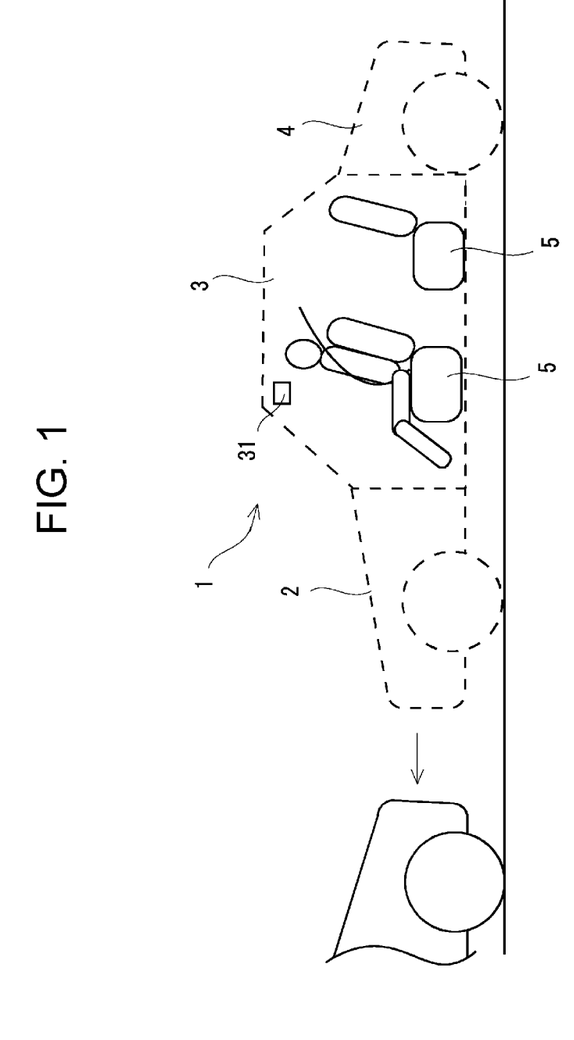
FIG. 1 is a perspective side view of an automobile according to an implementation of the present invention.

FIG. 1 is a perspective side view of an automobile 1 according to an implementation of the present invention. The automobile 1 is an example of a vehicle. In FIG. 1, another automobile 1 running ahead of the automobile 1 is also illustrated.

The automobile 1 in FIG. 1 has a vehicle body constituted of a front compartment 2, an occupant compartment 3, and a rear compartment 4. Power units, such as an engine and an electric motor, are disposed in the front compartment 2. A luggage space is provided in the rear compartment 4. Seats 5 on which on-board occupants sit are provided in the occupant compartment 3. Furthermore, in the occupant compartment 3, operable members, such as a gas pedal, a brake pedal, and a steering wheel, are provided in front of the driver seat 5. The automobile 1 moves forward, stops, and turns left and right based on operations performed by the driver.

Figure 2:
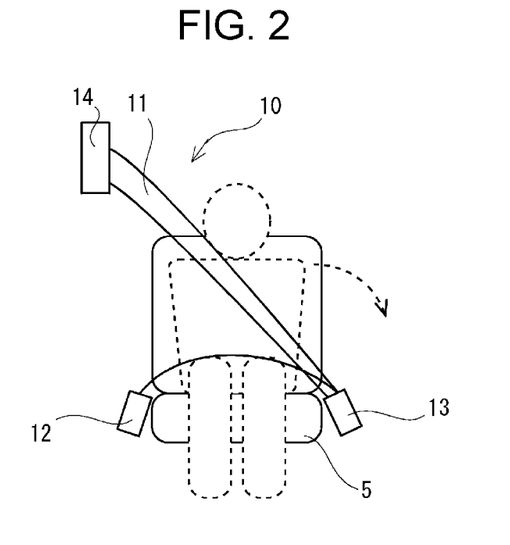
FIG. 2 illustrates a state where an occupant is protected by a three-point seatbelt device.

FIG. 2 illustrates a state where an occupant is protected by a three-point seatbelt device 10.

The three-point seatbelt device 10 has a seatbelt 11, an anchor 12, a buckle 13, and a retractor 14.

The seatbelt 11 extends across the front of the body of the occupant sitting on the seat 5. In the example in FIG. 2, the seatbelt 11 extends at an angle in front of the upper body from the left collarbone toward the right side of the waist, and further extends substantially horizontally in front of the waist from the right side of the waist toward the left side of the waist.

The anchor 12 secures the leading end of the seatbelt 11 at an outer position of the seat surface of the seat 5.

The buckle 13 is secured at an inner position of the seat surface of the seat 5. A tongue plate (not illustrated) with the seatbelt 11 inserted therethrough is attached to the buckle 13 in a detachable manner.

The retractor 14 has, for example, a reel for retracting the seatbelt 11, a motor that rotationally drives the reel in forward and reverse directions, and a gas generator that causes the reel to quickly rotate in the retracting direction.

For example, the occupant sitting on the seat 5 pulls the tongue plate to pull out the seatbelt 11 from the retractor 14, and then fastens the tongue plate to the buckle 13. Thus, the seatbelt 11 is extended as illustrated in FIG. 2. The retractor 14 operates in this state so that the occupant sitting on the seat 5 can be supported by the seatbelt 11 while being pressed against the seat 5.

However, because the three-point seatbelt device 10 only restrains the upper body of the occupant, it is not possible to suppress contact of the occupant's head and neck with the upper body when a collision occurs.

Accordingly, in the automobile 1, it is desirable to readily suppress contact of the occupant's head and neck with the upper body when a collision occurs.

Figure 3:
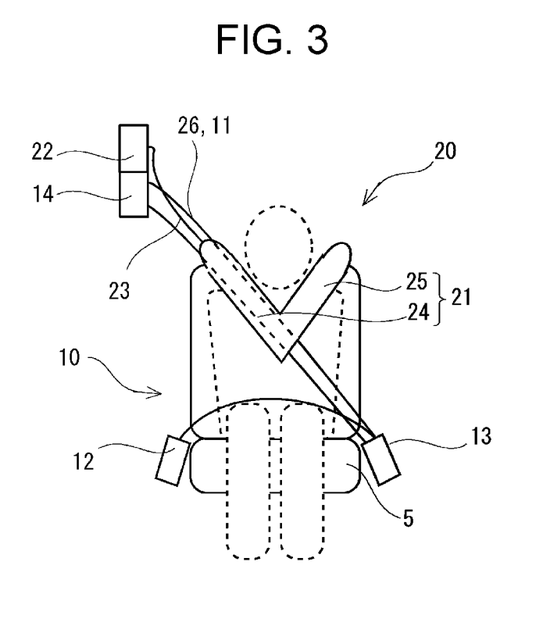
FIG. 3 illustrates a state where an occupant is protected by a belt airbag device according to this implementation.

FIG. 3 illustrates a state where an occupant is protected by a belt airbag device 20 according to this implementation.

An occupant protection device in FIG. 3 has the belt airbag device 20 together with the three-point seatbelt device 10.

The belt airbag device 20 in FIG. 3 has a belt airbag 21, a main unit 22 having an inflator, and a tube 23 that couples the belt airbag 21 and the inflator to each other.

The main unit 22 of the belt airbag device 20 is disposed inside, for example, the B pillar of the vehicle body. The main unit 22 may alternatively be disposed in the back of the seat 5.

The belt airbag 21 is deployed when a collision occurs. The belt airbag 21 has a belt-direction deployment section 24 and an intersecting-direction deployment section 25. The belt-direction deployment section 24 and the intersecting-direction deployment section 25 have the same length and are coupled to each other at the lower ends thereof so as to constitute a single substantially-V-shaped bag.

The belt-direction deployment section 24 is provided at an upper segment of a shoulder belt section 26, which extends from the left shoulder toward the waist of the occupant, of the seatbelt 11. The belt-direction deployment section 24 extends along the shoulder belt section 26.

The intersecting-direction deployment section 25 extends in a direction intersecting the shoulder belt section 26 from the central area of the shoulder belt section 26 toward the right shoulder of the occupant.

Accordingly, the substantially-V-shaped belt airbag 21 is provided at the upper segment of the shoulder belt section 26. Thus, the substantially-V-shaped belt airbag 21 is disposed in the substantially V-shape below the head of the occupant sitting on the seat 5.

Figure 4:
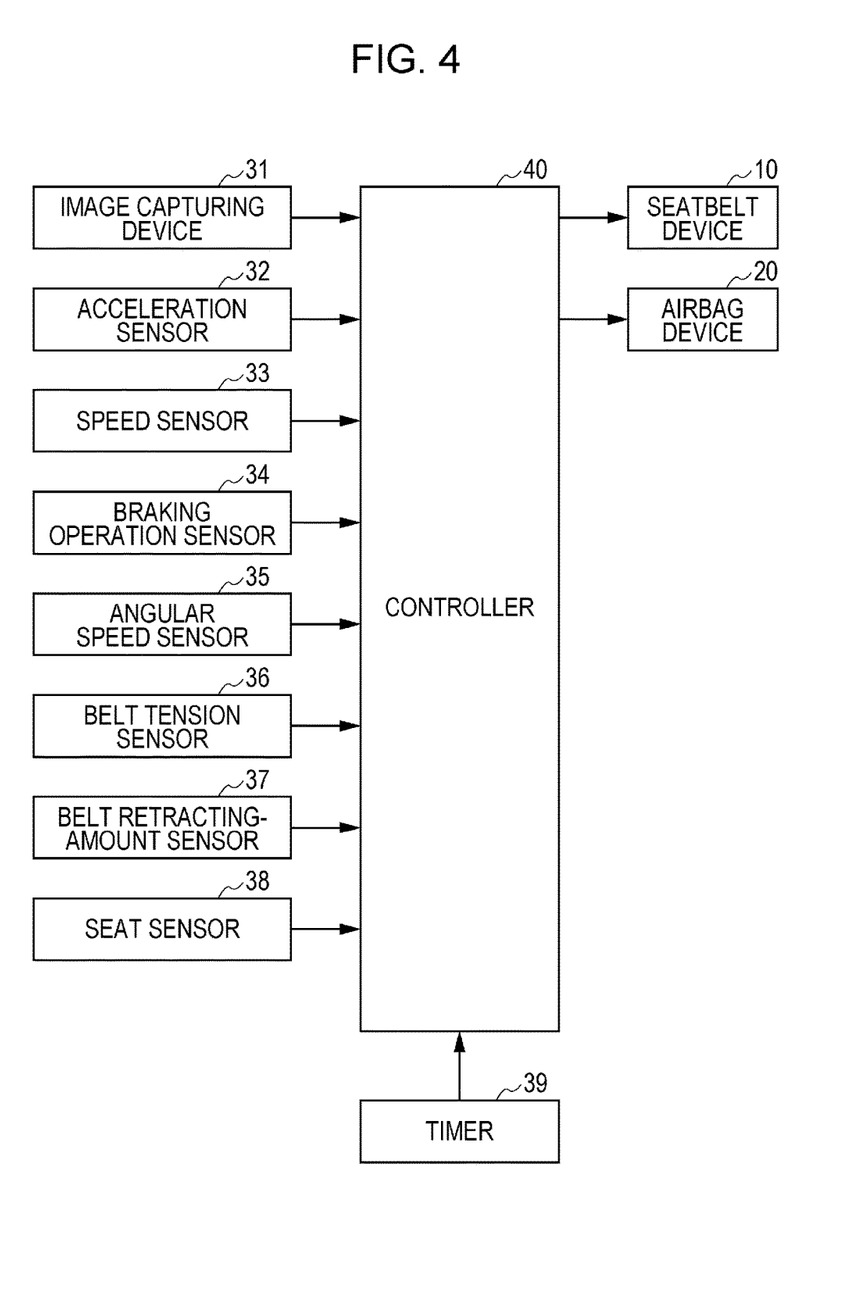
FIG. 4 is a block diagram of a control system of the belt airbag device in FIG. 3.

FIG. 4 is a block diagram of a control system of the belt airbag device 20 in FIG. 3.

The control system in FIG. 4 has an image capturing device 31, an acceleration sensor 32, a speed sensor 33, a braking operation sensor 34, an angular speed sensor 35, a belt tension sensor 36, a belt retracting-amount sensor 37, a seat sensor 38, a timer 39, and a controller 40 coupled to these devices. Furthermore, the seatbelt device 10 and an airbag device that are coupled to and are controlled by the controller 40 are also illustrated in FIG. 4. The airbag device in this case includes the belt airbag device 20.

The image capturing device 31 is, for example, a pair of image capturing elements provided facing forward at either one of the roof of the occupant compartment 3 and the front windshield, as illustrated in FIG. 1, and observes the peripheral conditions ahead of the automobile 1 by imaging. The controller 40 may specify an obstacle, such as another automobile 1 ahead of the automobile 1, as a peripheral condition of the automobile 1 from the captured image and determine that there is a possibility of a collision with the obstacle. Thus, the running condition of the automobile 1 prior to a collision can be detected.

The acceleration sensor 32 is fixed to the vehicle body and detects acceleration acting on the automobile 1 as a running condition of the automobile 1. Thus, deceleration of the automobile 1 prior to a collision can be detected. Since large deceleration occurs in the event of a collision, a collision of the automobile 1 can be detected.

The speed sensor 33 is fixed to the vehicle body and detects the speed of the automobile 1 as a running condition of the automobile 1.

The braking operation sensor 34 is provided within the occupant compartment 3 and detects whether the brake pedal is pressed by the occupant. Thus, an operation for decelerating the automobile 1 prior to a collision can be detected.

The angular speed sensor 35 is fixed to the vehicle body and detects the speed of the automobile 1 as a running condition of the automobile 1.

The belt tension sensor 36 is provided in, for example, the retractor 14 and detects tension acting on the seatbelt 11. Thus, either one of relatively forward movement of the occupant's body during a collision and tension acting on the seatbelt 11 due to the movement of the body can be detected.

The belt retracting-amount sensor 37 is provided in, for example, the retractor 14 and detects the retracting amount of the seatbelt 11.

The seat sensor 38 is provided at, for example, the seat surface of the seat 5 and detects whether or not an occupant is sitting on the seat 5, as well as the seated position.

The timer 39 measures time.

Based on detection signals from these sensors, the controller 40 controls the occupant protection operation performed by the seatbelt device 10 and the belt airbag device 20. For example, the controller 40 performs pre-collision control based on a collision prediction and performs collision control based on detection of a collision.

Figure 5:
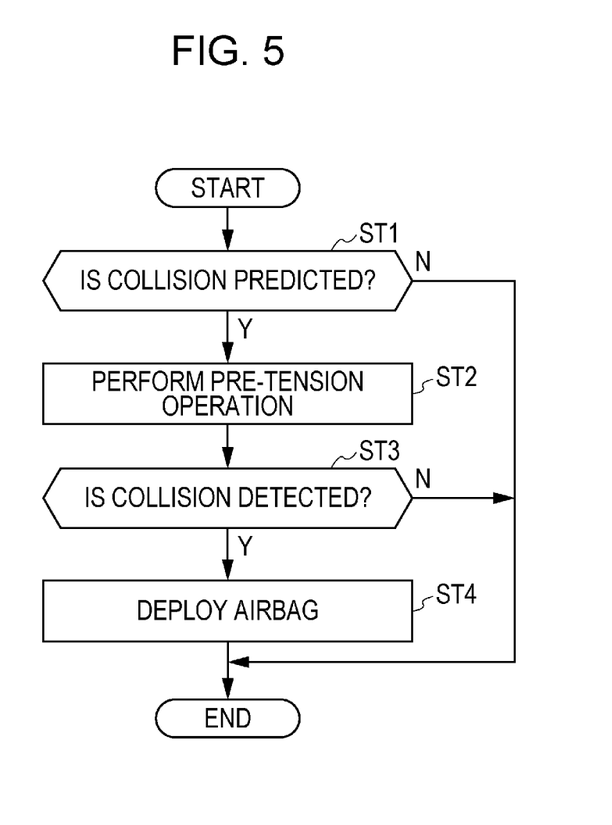
FIG. 5 is a flowchart illustrating an example of operation performed by an occupant protection device in FIG. 3.

FIG. 5 is a flowchart illustrating an example of operation performed by the occupant protection device in FIG. 3.

As illustrated in FIG. 3, the occupant is sitting on the seat 5 prior to a collision.

The controller 40 periodically predicts a possibility of a collision based on an image captured by the image capturing device 31 (step ST1). Then, if there is a possibility of a collision, the controller 40 activates the seatbelt device 10 by performing a pre-tension operation (step ST2). Thus, the upper body of the occupant is supported while being pressed against the seat 5.

Subsequently, the controller 40 detects the collision based on, for example, a detection value obtained by the acceleration sensor 32 (step ST3).

When the collision is detected, the controller 40 deploys the airbag (step ST4).

Specifically, when the collision is detected, the belt airbag device 20 turns on the inflator so as to deploy the belt airbag 21. The belt-direction deployment section 24 and the intersecting-direction deployment section 25 are deployed by high-pressure gas from the inflator, so that the belt airbag 21 inflates in a substantially V-shape.

Thus, when the collision occurs, the upper body of the occupant is supported by the seatbelt 11 while being pressed against the seat 5. If the occupant's head tries to move forward or sideways in this state, the jaw or the side of the head hits against the belt airbag 21 deployed in the substantially V-shape. This prevents the head from moving any further.

Accordingly, in this implementation, when a collision occurs, the belt airbag 21 is deployed at the shoulder belt section 26 of the seatbelt 11. Moreover, the belt airbag 21 has the belt-direction deployment section 24 that extends and deploys along the shoulder belt section 26 and also has the intersecting-direction deployment section 25 that extends and deploys in the direction intersecting the shoulder belt section 26. The belt-direction deployment section 24 and the intersecting-direction deployment section 25 are coupled to each other in an upwardly protruding state below the head of the occupant sitting on the seat 5 so as to form a single bag. Thus, when the collision occurs, the belt-direction deployment section 24 deploys along the shoulder belt section 26 of the seatbelt 11 and the intersecting-direction deployment section 25 deploys in the direction intersecting the shoulder belt section 26, below the head of the occupant sitting on the seat 5. Therefore, for example, even if the head tries to move forward or sideways in the state where the upper body is supported by the three-point seatbelt 11, the jaw hits against at least one of the belt-direction deployment section 24 and the intersecting-direction deployment section 25, so that the head is unlikely to move any further. As a result, when the collision occurs, contact of the occupant's head and neck with the upper body can be readily suppressed.

Furthermore, in this implementation, the belt-direction deployment section 24 extending along the shoulder belt section 26 has the same length as the intersecting-direction deployment section 25, and the intersecting-direction deployment section 25 and the belt-direction deployment section 24 are coupled to each other at the lower ends thereof so as to form a substantially V-shape. Consequently, a substantially-V-shaped airbag is deployed below the occupant's head, so that forward or sideways movement of the head can be suppressed. In addition, with the belt airbag 21 being substantially V-shaped, the belt airbag 21 has minimal capacity and can thus be deployed immediately. As a result, this enables protection at an early stage.

Although the implementation described above is an example of a preferred implementation of the present invention, the present invention is not limited to the above implementation and permits various modifications and alterations so long as they do not depart from the scope of the invention.

Figure 6:
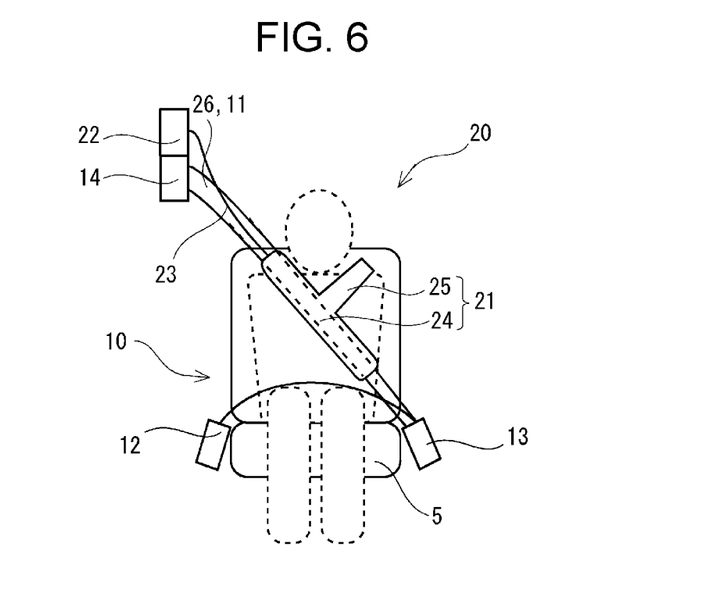
FIG. 6 illustrates a first modification of a belt airbag.

FIG. 6 illustrates a first modification of the belt airbag 21.

In FIG. 6, the belt-direction deployment section 24 extending along the shoulder belt section 26 is longer than the intersecting-direction deployment section 25. Furthermore, the lower end of the intersecting-direction deployment section 25 is coupled to the center of the longer belt-direction deployment section 24, so that a substantially y-shape is formed.

Accordingly, the belt-direction deployment section 24 extends further downward from the V-shape so that a substantially y-shape is formed, whereby the V-shaped area receiving a load is less likely to move away from the front face of the upper body. Consequently, the V-shaped area can be maintained at the position below the jaw even when a larger load is applied.

Figure 7:
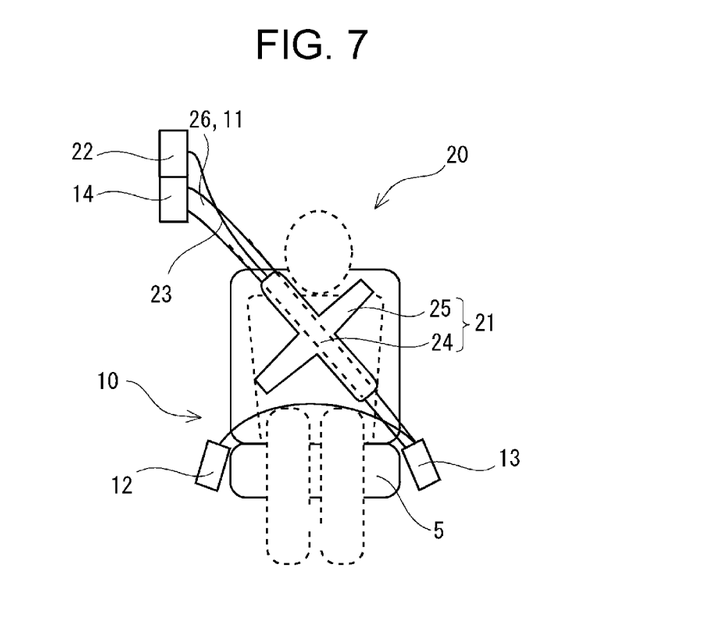
FIG. 7 illustrates a second modification of the belt airbag.

FIG. 7 illustrates a second modification of the belt airbag 21.

In FIG. 7, the belt-direction deployment section 24 and the intersecting-direction deployment section 25 are coupled to each other at the centers thereof so as to form a substantially X-shape.

With such a substantially X-shape, the V-shaped area below the jaw is less likely to move downward due to a load and is also less likely to be twisted. Consequently, the V-shaped area can be maintained at the position below the jaw even when, for example, a large load acts in an obliquely-downward direction.

Figure 8:
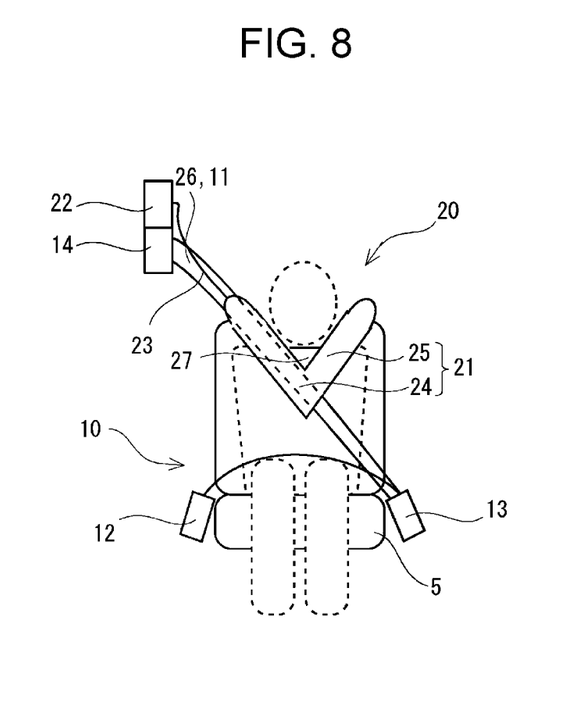
FIG. 8 illustrates a third modification of the belt airbag.

FIG. 8 illustrates a third modification of the belt airbag 21.

In FIG. 8, a filler 27 that fills the space between the belt-direction deployment section 24 and the intersecting-direction deployment section 25 is formed above the area where the belt-direction deployment section 24 and the intersecting-direction deployment section 25 are coupled to each other. The filler 27 may be, for example, plate-shaped rubber or cloth.

Accordingly, the space above the area where the belt-direction deployment section 24 and the intersecting-direction deployment section 25 are coupled to each other is filled with the filler 27 so that, when a load is applied, the V-shaped area formed by the belt-direction deployment section 24 and the intersecting-direction deployment section 25 is less likely to deform in an expanding manner. As a result, the belt airbag 21 can reliably receive the load of the head.

The invention claimed is:

1. An occupant protection device for a vehicle, the occupant protection device comprising:
   a seat on which an occupant to board the vehicle is to sit;
   a three-point seatbelt device including a seatbelt extendable across a front of an upper body of the occupant sitting on the seat; and
   a belt airbag device comprising a belt airbag that is provided at a shoulder belt section, which is extendable from a shoulder to a waist of the occupant, of the seatbelt, the belt airbag being configured to be deployed when a collision occurs,
   wherein the belt airbag comprises:
      a belt-direction deployment section extendable and deployable along the shoulder belt section; and
      an intersecting-direction deployment section extendable and deployable in a direction intersecting the shoulder belt section,
   wherein the belt-direction deployment section and the intersecting-direction deployment section are configured to form a single bag by being coupled to each other below a head of the occupant sitting on the seat,
   wherein the belt-direction deployment section is longer than the intersecting-direction deployment section when the belt-direction deployment section extends along the shoulder belt section, and
   wherein a filler that fills a space between the belt-direction deployment section and the intersecting-direction deployment section is formed above an area where the belt-direction deployment section and the intersecting-direction deployment section are coupled to each other.

2. An occupant protection device for a vehicle, the occupant protection device comprising:
   a seat on which an occupant to board the vehicle is to sit;
   a three-point seatbelt device including a seatbelt extendable across a front of an upper body of the occupant sitting on the seat; and
   a belt airbag device comprising a belt airbag that is provided at a shoulder belt section, which is extendable from a shoulder to a waist of the occupant, of the seatbelt, the belt airbag being configured to be deployed when a collision occurs,
wherein the belt airbag comprises:
a belt-direction deployment section extendable and deployable along the shoulder belt section; and
an intersecting-direction deployment section extendable and deployable in a direction intersecting the shoulder belt section,
wherein the belt-direction deployment section and the intersecting-direction deployment section are configured to form a single bag by being coupled to each other below a head of the occupant sitting on the seat,
wherein the belt-direction deployment section is longer than the intersecting-direction deployment section when the belt-direction deployment section extends along the shoulder belt section,
wherein the belt-direction deployment section and the intersecting-direction deployment section form a substantially X-shape by being coupled to each other at centers thereof, and
wherein a filler that fills a space between the belt-direction deployment section and the intersecting-direction deployment section is formed above an area where the belt-direction deployment section and the intersecting-direction deployment section are coupled to each other.

3. An occupant protection device for a vehicle, the occupant protection device comprising:
a seat on which an occupant to board the vehicle is to sit;
a three-point seatbelt device including a seatbelt extendable across a front of an upper body of the occupant sitting on the seat; and
a belt airbag device comprising a belt airbag that is provided at a shoulder belt section, which is extendable from a shoulder to a waist of the occupant, of the seatbelt, the belt airbag being configured to be deployed when a collision occurs,
wherein the belt airbag comprises:
a belt-direction deployment section extendable and deployable along the shoulder belt section; and
an intersecting-direction deployment section extendable and deployable in a direction intersecting the shoulder belt section,
wherein the belt-direction deployment section and the intersecting-direction deployment section are configured to form a single bag by being coupled to each other below a head of the occupant sitting on the seat,
wherein the belt-direction deployment section is longer than the intersecting-direction deployment section when the belt-direction deployment section extends along the shoulder belt section, and
wherein the belt-direction deployment section and the intersecting-direction deployment section form a substantially X-shape by being coupled to each other at centers thereof.

4. The occupant protection device for a vehicle according to claim 3, wherein a filler that fills a space between the belt-direction deployment section and the intersecting-direction deployment section is formed above an area where the belt-direction deployment section and the intersecting-direction deployment section are coupled to each other.

* * * * *